United States Patent [19]

Nespor

[11] Patent Number: 4,875,822
[45] Date of Patent: Oct. 24, 1989

[54] QUICK-COUPLE L-BAR SLEEVE ASSEMBLY FOR WHEEL LIFT

[75] Inventor: Ronald R. Nespor, Sharpsville, Pa.

[73] Assignee: Chevron, Inc., Mercer, Pa.

[21] Appl. No.: 204,454

[22] Filed: Jun. 9, 1988

[51] Int. Cl.$^4$ .............................................. B60P 3/12
[52] U.S. Cl. ..................................... 414/563; 280/402
[58] Field of Search ............................ 414/426–430, 414/563; 280/402; 403/375, 379

[56] References Cited

U.S. PATENT DOCUMENTS

| | | | |
|---|---|---|---|
| 3,182,829 | 5/1965 | Wagner | 414/563 |
| 4,557,496 | 12/1985 | Sill | 414/563 X |
| 4,637,623 | 1/1987 | Bubik | 280/402 |
| 4,679,978 | 7/1987 | Holmes et al. | 414/563 |
| 4,741,661 | 5/1988 | Casey | 414/563 |
| 4,775,285 | 10/1988 | Zackovich | 414/563 |

Primary Examiner—David A. Bucci
Attorney, Agent, or Firm—Buchanan Ingersoll

[57] ABSTRACT

Oppositely extending telescopic wheel support sleeves with wheel support cradles are attached to open top shoes provided at the outer ends of the sleeves. Each of the cradles has a connector arm for securing the cradles to the shoes so that the sleeves and the cradles cooperate to support the wheels of a towed vehicle. The open top shoes provided at the outer end of each of the sleeves allow the end of the connector arm nearest to the shoe to enter the shoe by swinging downwardly in an arc extending from a position above the shoe into the shoe. The connector arms are locked in the shoe.

5 Claims, 3 Drawing Sheets

QUICK-COUPLE L-BAR SLEEVE ASSEMBLY FOR WHEEL LIFT

This invention relates to a wheel lift for towing a vehicle. More particularly, this invention relates to a quickcouple L-bar sleeve assembly for cradling the wheels of an automotive vehicle being towed in a wheel lift.

The wheel lift assembly of this invention includes oppositely extending telescopic wheel support sleeves with L-bar wheel support cradles attached to open top shoe means provided at the outer end of each of said sleeves. Each of said cradles has connector arms for the securing of said cradles to the shoe means so that said shoe means and said cradles cooperate to retain and support the wheels of a towed vehicle. The open top feature of the shoe means attached to the outer end of each of said sleeves allows the end of the connector arms nearest to the shoe means to enter the shoe means either by horizontal insertion or by swinging downwardly in an arc from a position above the shoe means. A series of open top notches can be provided along the upper edge of the connector arms. Locking means, such as a pin, is provided for entering into a notch through an opening in the shoe means and thereby locking the connector arm means within the shoe means.

The open top shoe means and the downward swing mode of installation are adapted to avoid obstructions in both the road and in parts of the shoe itself when installing the wheel cradle. Furthermore, the open top feature of the shoe means provides versatility in modes of connecting the cradle to the shoe, allowing the most rapid mode under the circumstances to be chosen. The cradle can be inserted into the shoe by swinging downwardly in an arc or it can be inserted horizontally into the shoe, thereby increasing ease of installation. In addition, the open top feature of the shoe means and of the notches on the upper edge of the connector arms permit visible observation that the cradle is locked into the shoe by means of a pin or other lock, thereby providing assurance against lock failure.

The invention will be more completely understood by reference to the accompanying drawings in which FIG. 1 illustrates the attachment of a wheel lift assembly to a vehicle frame structure;

Figure 1:
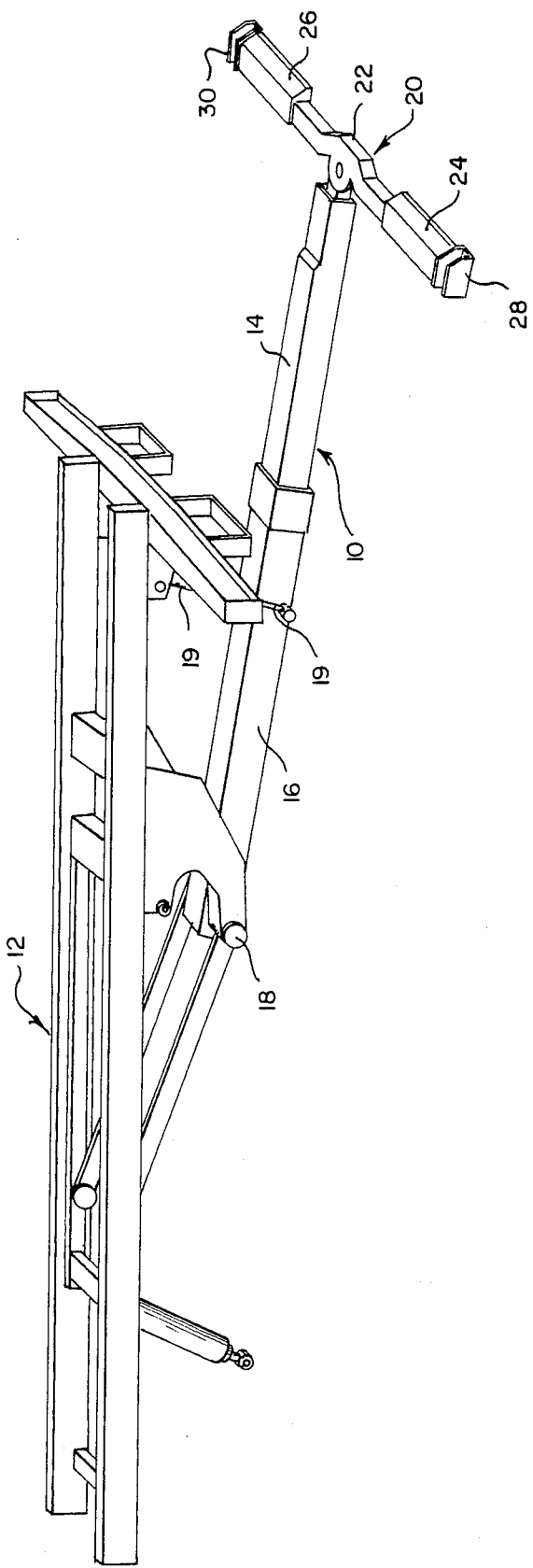

FIG. 1 illustrates the connection of wheel lift assembly 10 to the rearward underside of a subframe structure 12 used for attachment to the chassis of a towing vehicle, not shown. Subframe structure 12 is described in my application Ser. No. 204,642, filed on the same date as this application, entitled Vehicle Carrier With Wheel Lift. Although wheel lift assembly 10 is shown as attached to subframe structure 12, this is only an example and assembly 10 can also be attached to the chassis of any conventional towing vehicle.

Wheel lift assembly 10 comprises a plurality of extendable and retractable telescoping tube members 14 and 16 with forward tube member 16 pivoted on axle 18 to permit swinging upwardly and downwardly in a vertical arc by means of an hydraulic piston 19. At the rearward end of tube member 14 is mounted a laterally expandable sleeve assembly 20. Sleeve assembly 20 comprises central bar 22 having laterally extendable sleeves 24 and 26. The outside end of sleeve 24 is provided with an open top shoe 28 and the outside end of sleeve 26 is provided with an open top shoe 30. Shoes 28 and 30 comprise open U-shaped channels formed by a bottom wall and a pair of spaced apart side walls secured to and extending upwardly from the bottom wall.

Figure 2:
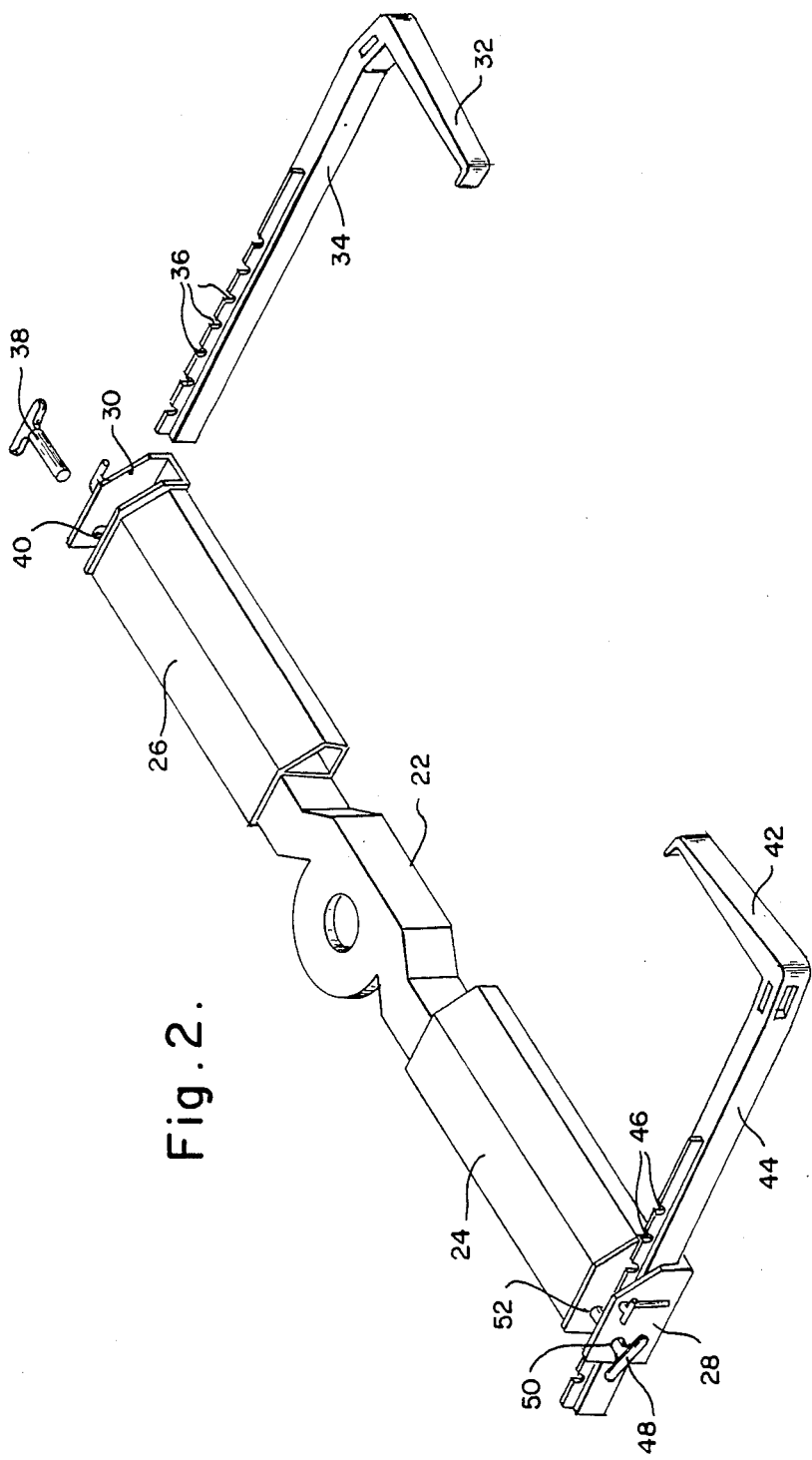
FIG. 2 illustrates the attachment of wheel support cradles to support sleeves.

FIG. 2 shows wheel cradle 32 having connector arm 34 with a plurality of open top notches 36 extending along its upper edge. The cradle is in position for horizontal insertion into shoe 30. Notches 36 are longitudinally spaced along the upper edge of connector arm 34. Pin 38 is also in postion for insertion through opening 40 in the side of shoe 30 to engage a notch 36 and thereby lock connector arm 34 in place in shoe 30. FIG. 2 also shows wheel cradle 42 having connector arm 44 with a plurality of notches 46 already locked in place in shoe 28 by means of pin 48 which is inserted through openings 50 and 52 in the opposite side walls of shoe 28.

Figure 4:
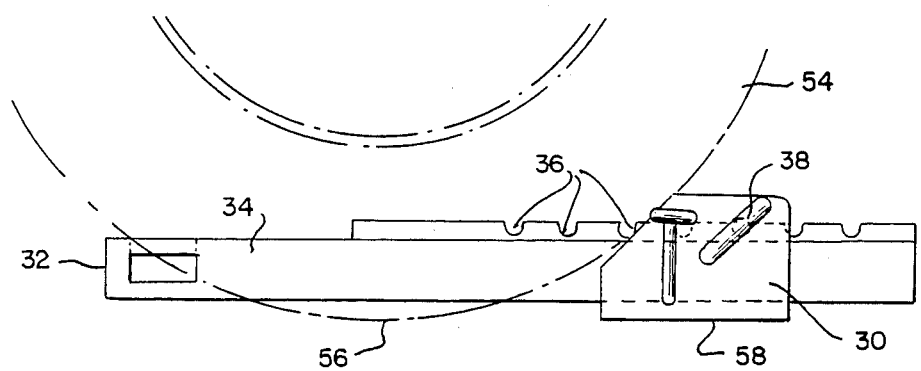
FIG. 4 shows the position of the wheel of a towed vehicle within a support cradle.
Figure 3:
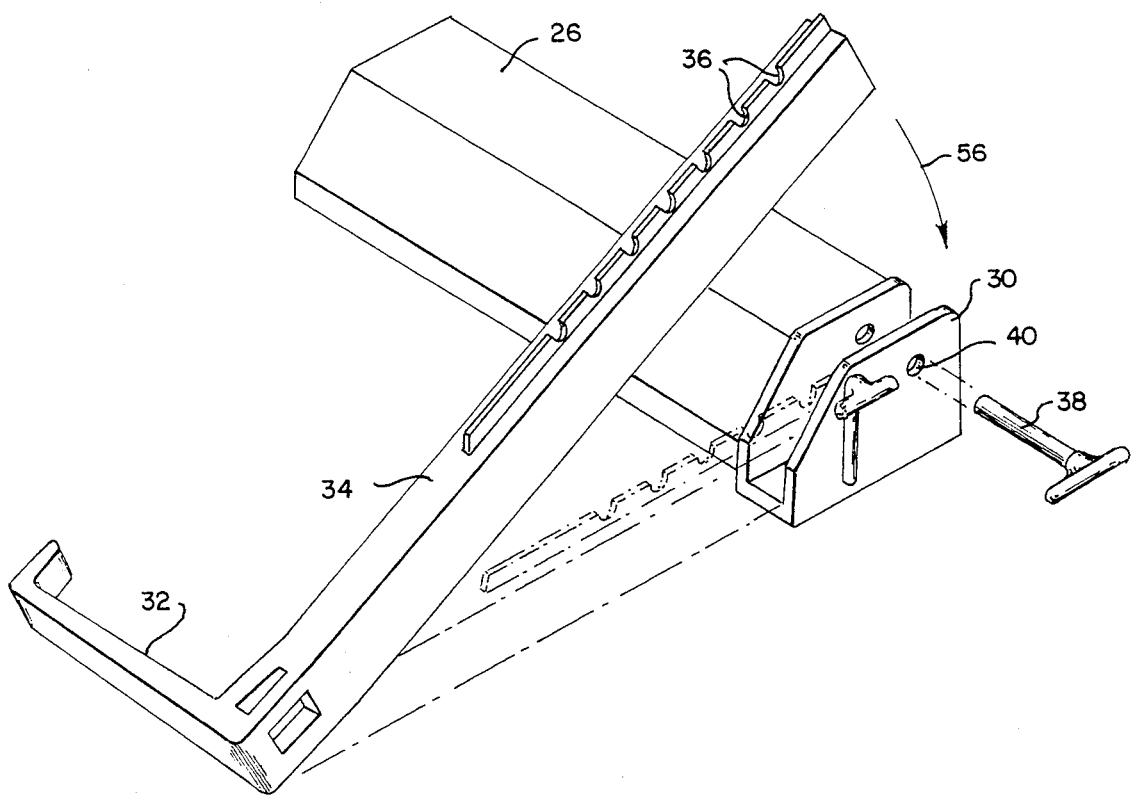
FIG. 3 illustrates a preferred mode of attachment of support cradles to support sleeves.

FIG. 3 and FIG. 4 illustrate the preferred mode of installing connector arm 34 of cradle 32. As shown, cradle 32 can be manually urged against a lower side of tire 54 of a vehicle wheel while connector arm 34 is inclined upwardly. Then, the free end of connector arm 34 is swung downwardly through vertical arc 56 so that it enters shoe 30 from above through the open top thereof and without obstruction from any part of shoe 30 or from any other physical impediment, such as irregularities in the road.

FIG. 2 shows cradle 32 set to be inserted into shoe 30 by a horizontal installation mode. FIG. 3 shows cradle 32 being installed into shoe 30 by a vertical swing mode. Therefore, the open top shoe means provides ease of installation by providing for a variety of modes of installation depending upon circumstances.

FIG. 2 shows that when cradle 42 is locked in place in shoe 28, the open top feature permits direct observation of the lock, thereby providing assurance against lock failure.

I claim:

1. In a wheel lift assembly comprising
   oppositely extending telescopic wheel support sleeves,
   wheel support cradles attached to the outer ends of said sleeves,
   each of said cradles having connector arm means for securing said cradles to the outer ends of said sleeves so that said sleeves and said cradles cooperate to retain and support the wheels of a towed vehicle,
   open top shoe means at the outer end of each of said sleeves,
   each of said open top shoe means including a bottom wall for receiving said connector arm means and a pair of side walls secured to and extending upwardly from said bottom wall,
   said side walls positioned in spaced relation to form an opening for allowing the end of said connector arm means nearest to said shoe means to enter said shoe means through said opening by swinging downwardly in an arc extending from a position above said shoe means into said shoe means and onto said bottom wall, and
   locking means for locking said connector arm means within said shoe means.

2. The wheel lift assembly of claim 1 wherein said locking means comprises a plurality of open top notches longitudinally spaced on the upper edge of said connector arm means for cooperating with locking pin means, whereby the locking pin means when installed is visible from a position above said shoe means.

3. The wheel lift assembly of claim 1 wherein said locking means includes pin means for insertion through an opening in said shoe means for engaging said connector arm means.

4. The wheel lift assembly of claim 1 wherein said shoe means generally comprises a U-shaped channel having an open top.

5. The wheel lift assembly of claim 4 including facing opening means on the opposing sides of said channel and pin means for insertion through said opening means to lock said connector arm means in place.

* * * * *